United States Patent Office 3,644,466
Patented Feb. 22, 1972

3,644,466
α-CYANO-β,β-DIPHENYLACRYLIC ACID ESTERS
Albert F. Strobel, Delmar, and Sigmund C. Catino, Castleton, N.Y., assignors to GAF Corporation, New York, N.Y.
No Drawing. Continuation of application Ser. No. 121,820, July 5, 1961, which is a continuation-in-part of application Ser. No. 13,706, Mar. 9, 1960. This application May 6, 1966, Ser. No. 548,334
The portion of the term of the patent subsequent to Aug. 22, 1987, has been disclaimed
Int. Cl. C07c *121/40;* C08f *45/60;* C08g *51/60*
U.S. Cl. 260—465     9 Claims

ABSTRACT OF THE DISCLOSURE

The ultra-violet light absorbing compound of the formula:

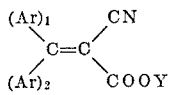

wherein:
(1) $(Ar)_1$ and $(Ar)_2$ are aromatic carbocyclic nuclei devoid of nitro and nuclear bonded amine groups and selected from the class consisting of mono- and bicyclic nuclei, and
(2) Y is a substituted alkyl group selected from the class consisting of hydroxy alkyl, cyanoalkyl, haloalkyl, alkoxyalkyl, hydroxy alkoxyalkyl and carbalkoxyalkyl.

---

This application is a continuation of application Ser. No. 121,820 filed July 5, 1961, and now abandoned. The latter identified application is a continuation-in-part of application Ser. No. 13,706 filed Mar. 9, 1960, and now U.S. Pat. 3,337,357.

This invention relates to new and useful compounds which impart to organic materials superior resistance to degradation and deterioration when they are exposed to actinic radiation, and in particular to ultra-violet radiation. This invention further relates to processes for the preparation of new and useful compounds of the type hereinbefore described. The compounds with which this invention is concerned are characterized as α-cyano-β,β-diphenylacrylic acid derivatives.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiation. Many commercial products are either unstable when subjected to such radiations, or are affected to the extent that they become undesirable or unsalable. Many plastic materials, when exposed to this radiation, undergo substantial degradation resulting in the development of undesriable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency property may not be paramount.

We have discovered that by combining α-cyano-β,β-diphenylacrylic acid derivatives with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds with which this invention is concerned, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hyroxybenzophenone absorbers must have such a grouping. The presence of an hydroxyl which is capable of salt formation renders these absorbers unsuitable for use in alkaline media and particularly in alkaline plastic materials such as epoxies, melamines and the like. While the compounds of the present invention do not require an hydroxyl group, the presence thereof is not a disadvantage, or detriment where alkaline sensitivity is no problem.

It is therefore and object of the present invention to provide new and useful compounds characterized by outstanding ultra-violet absorbing properties.

It is still another object of this invention to provide new and useful α-cyano-β,β-diphenylacrylic acid derivatives which are outstanding ultra-violet absorbing compounds.

It is a still further object of the present invention to provide processes for the preparation of new and useful ultra-violet absorbing compounds.

It is a still further object of the present invention to provide processes for the preparation of new and useful ultra-violet absorbing compounds which are derivatives of α-cyano-β,β-diphenylacrylic acid.

Other objects will appear hereinafter as the description proceeds.

The α-cyano-β,β-diphenylacrylic acid derivatives which are contemplated in this invention are devoid of nitro groups and are characterized by the following general formula:

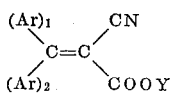

wherein $(Ar)_1$ and $(Ar)_2$ represent aromatic carbocyclic nuclei devoid of nuclear bonded amino groups and Y may be substituted-alkyl such as hydroxyalkyl, cyanoalkyl, haloalkyl, alkoxyalkyl, hydroxyalkoxyalkyl, carbalkoxyalkyl and the like, and hydroxyalkylamide.

The following specific substituents for Y may be employed in the above general formula:

cyanoethyl
cyano-n-propyl
cyano-isopropyl
cyano-n-butyl
cyano-isobutyl
cyano-n-amyl
cyano-isoamyl
cyanohexyl
cyanoheptyl
cyano-n-octyl
cyano-nonyl
cyanodecyl
cyanolauryl
cyanostearyl and the like
hydroxyethyl
hydroxy-n-propyl
hydroxy-isopropyl
hydroxy-n-butyl
hydroxy-isobutyl
hydroxy-n-amyl
hydroxy-isoamyl
hydroxy-hexyl
hydroxy-heptyl
hydroxy-nonyl
hydroxy-decyl
hydroxy-lauryl
hydroxy-stearyl and the like
carbomethoxyethyl
carbomethoxypropyl
carbomethoxybutyl
carbomethoxyamyl
carbomethoxyhexyl
carbethoxyethyl
carbethoxypropyl
carbethoxybutyl, etc.
carbopropoxyethyl
carbopropoxypropyl
carbopropoxybutyl, etc.
carbobutoxyethyl
carbobutoxybutyl, etc.
chloroethyl
chloropropyl (N-propyl, isopropyl)
chlorobutyl (N-butyl, isobutyl, etc.)
chloroamyl
chlorohexyl
chlorodecyl
chlorolauryl, and the like
bromoethyl
bromopropyl (N-propyl, isopropyl)
bromobutyl (N-butyl, isobutyl, etc.)
bromoamyl
bromohexyl
bromodecyl
bromolauryl, and the like.
methoxyethyl
methoxypropyl (N-propyl, isopropyl)
methoxybutyl (N-butyl, isobutyl, etc.)
methoxyamyl
methoxyhexyl
methoxydecyl
methoxylauryl, and the like.
ethoxyethyl
ethoxypropyl (N-propyl, isopropyl)
ethoxybutyl (N-butyl, isobutyl, etc.)
ethoxyamyl
ethoxyhexyl
ethoxydecyl
ethoxylauryl, and the like
hydroxyethoxyethyl
hydroxyethoxypropyl
hydroxyethoxybutyl
hydroxyethoxyamyl
hydroxypropoxyethyl
hydroxypropoxypropyl
hydroxypropoxybutyl
hydroxypropoxyamyl
hydroxybutoxyethyl
hydroxybutoxypropyl
hydroxybutoxybutyl
hydroxybutoxyamyl
bis(N,N-hydroxyethyl)amide
bis(N,N-hydroxypropyl)amide
N-hydroxyethyl-N-hydroxypropylamide, and the like.

The aromatic carbocyclic nuclei $(Ar)_1$ and $(Ar)_2$ are preferably phenyl or substituted phenyl but may also represent naphthyl and the like. Among the substituents which may be present in $(Ar)_1$ and $(Ar)_2$ are:

alkyl, e.g., methyl, ethyl, n-propyl, etc.
halogen
hydroxy
alkoxy
carboxy
carbonamide
sulfonamide
cyano
carbalkoxy
acyloxy
aryl, e.g., phenyl, tolyl, xenyl,
substituted aryl, e.g.,
halophenyl
cyanophenyl
carboxyphenyl, etc.

Among the specific benzophenone compounds which may be employed in the preparation of the compounds of this invention are the following:

2-chlorobenzophenone
2-fluorobenzophenone
3-fluorobenzophenone
3-chloro-2-hydroxy-5-methylbenzophenone
4'-chloro-3-methoxybenzophenone
2-chloro-4'-methylbenzophenone
2-chloro-4'-phenylbenzophenone
4'-chloro-2,4,6-trimethylbenzophenone
5,5'-dibromo-2,2'-dimethoxybenzophenone
2-hydroxy-4-methylbenzophenone
2-hydroxy-5-methylbenzophenone
4-hydroxy-2-methylbenzophenone
4-hydroxy-3-methylbenzophenone
2-methoxy-5-methylbenzophenone
4-methoxy-4'-methylbenzophenone
2,6-dimethoxy-3'-methylbenzophenone
2,5-dimethoxy-3,4-dimethylbenzophenone
4,4'-dimethoxy-3,3'-dimethylbenzophenone
4-octylbenzophenone
2,3,4,5,6-pentachlorobenzophenone
2,4,6-trimethyl-2',6'-diphenylbenzophenone
5,5'-dibromo-2,2',4,4'-tetramethoxybenzophenone
3,5-dichloro-2,2',4,6-tetramethoxybenzophenone
3',5'-dichloro-4'-hydroxy-2,4,6-trimethylbenzophenone
2,5-dimethyl-3,4-diphenylbenzophenone
3-chlorobenzophenone
4-chlorobenzophenone
2-bromobenzophenone
3-bromobenzophenone
4-bromobenzophenone
2-iodobenzophenone
3-iodobenzophenone 4-iodobenzophenone
4-fluorobenzophenone
4-cyanobenzophenone
benzophenone carboxylic acid (2)
benzophenone carboxylic acid (3)
benzophenone carboxylic acid (4)
2-benzoyl benzoic acid methyl ester
2-benzoyl benzoic acid ethyl ester
2-benzoyl benzoic acid amide
2-benzoyl benzoic acid monoethyl amide
3-benzoyl benzoic acid methyl ester
2-benzoyl benzoic acid ethyl ester
4-benzoyl benzoic acid methyl ester
4-benzoyl benzoic acid ethyl ester
2-sulfamide benzophenone
4-sulfamide benzophenone
2-phenyl benzophenone
2-benzoyl benzophenone
4,4'-di-toluyl benzophenone
3-phenyl benzophenone
4-phenyl benzophenone
N,N-dimethyl-2-sulfonamido benzophenone
2-carboxamido benzophenone
2-hydroxybenzophenone
3-hydroxybenzophenone
4-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)-benzophenone
4-(p-tolyloxy)-benzophenone
3-acetoxybenzophenone
4-isopentyloxybenzophenone
3-acetoxybenzophenone
4-acetoxybenzophenone
4-cyclohexyloxybenzophenone
4-benzyloxybenzophenone
2,4'-difluorobenzophenone
4,4'-difluorobenzophenone
2,4-dibromobenzophenone
2,6-dibromobenzophenone
2,2'-dibromobenzophenone
2,4'-dibromobenzophenone
3,3'-dibromobenzophenone
4,4'-dibromobenzophenone
4,4'-dichlorobenzophenone
2,4-dichlorobenzophenone
2,4'-dichlorobenzophenone
3,4-dichlorobenzophenone
4,4'-diiodobenzophenone
3,5-diiodobenzophenone
4-chloro-4'-bromobenzophenone
2,2'-diiodobenzophenone
2,4,6-tribromobenzophenone
2,4,6-trichlorobenzophenone
2,5,2',5'-tetrachlorobenzophenone
2,4,2',4'-tetrachlorobenzophenone
2-bromo-4'-phenylbenzophenone
2-chloro-4'-phenylbenzophenone
4(p-methoxyphenyl)-4'-phenylbenzophenone
4(p-hydroxyphenyl)-benzophenone
3-chloro-4(2-hydroxyethoxy)-benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone 4'-bromo-4-hydroxybenzophenone
4-bromo-4-ethoxybenzophenone
3-iodo-4-methoxybenzophenone
3-iodo-4-hydroxybenzophenone
4'-iodo-4-ethoxybenzophenone
2-chloro-2'-bromo-4-hydroxybenzophenone
3,5-dibromo-4-hydroxybenzophenone
3,5-diiodo-4-hydroxybenzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
2,2'-dihydroxy-4,4'-dipropoxybenzophenone
3,3'-dimethoxy-4,4'-bis(benzyloxy)-benzophenone In addition to the above contemplated derivatives, polyoxyalkylated derivatives of those compounds containing at least one reactive hydrogen atom are within the purview of this invention. From the compounds herein contemplated, the reactive hydrogen containing compounds are the hydroxycompounds, amides and sulfonamides. These are reacted with an alkylene oxide or a compound functioning as an oxide such as ethylene oxide, propylene oxide, butylene oxide, butylene dioxide, cyclohexane oxide, glycidol, epichlorohydrazin, butadiene dioxide, isobutylene oxide, styrene oxide and mixtures thereof, and the like, to yield the corresponding polyoxyalkylated product. The resultant hydroxy derivatives, e.g., have the following general formula:

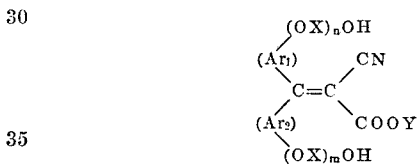

wherein X represents the hydrocarbon residue of the oxyalkylating agent, for example, ethylene (from ethylene oxide and epichlorohydrin), propylene (from propylene oxide), etc. and $n$ and $m$ are integers from 0 to about 100 except that at least one of these is at least 1 and wherein $n$ and $m$ represent the moles of oxyalkylating agent condensed with the hydroxy compound.

The general method for preparing the compounds of this invention involves a condensation of benzophenone or a substituted-benzophenone with a substituted-alkyl-cyanoacetate or hydroxyalkyl substituted-cyanoacetamide in a suitable solvent or under such conditions that dehydration occurs to form the substituted-ethylene or acrylic acid derivative.

The following examples will serve to illustrate the present invention without being deemed limitative thereof. Parts are by weight unless otherwise indicated.

EXAMPLE 1

Preparation of:

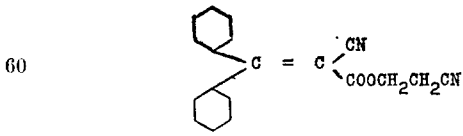

This compound is prepared by the condensation of the benzophenone and cyanoethylcyanoacetate, the latter having the formula $NCCH_2COOCH_2CH_2CH_2CN$. The latter is prepared by combining 2 moles of cyanoacetic acid, 2.2 moles of cyanoethyl alcohol, 300 mls. of chloroform and 10 gr. of a mixed alkane sulfonic acid catalyst in a 1 liter flask with a water separator and condenser. The mixture is heated under reflux with steam until no more water separates. The reaction mixture is then treated with dilute sodium hydroxide solution and thereafter washed with water until neutral. The product is then extracted with chloroform, dried and solvent distilled.

The condensation between the aforementioned reactants is carried out as follows: into a 1 liter flask fitted with a stirrer, thermometer, reflux condenser, water trap and heating mantle, there are charged the following:

69.0 g. cyanoethylcyanoacetate (0.5 mol)
91.0 g. benzophenone (0.5 mol)
5.0 g. ammonium acetate
20 cc. glacial acetic acid, and
175 ml. of benzene.

The above charge is stirred for 12 hrs. at the reflux temperature. The benzene is then distilled off and to the residue there is added 250 ml. of water which is then filtered. The resultant solid material is then slurried in 250 ml. of water and filtered again. The product is air dried. Further purification is carried out by recrystallizing a small portion, e.g., 20 g. from a solution of 150 ml. of ethanol and 300 ml. of water.

EXAMPLE 2

Preparation of:

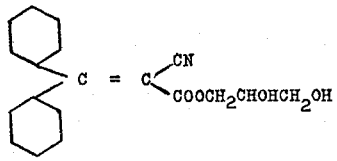

This product is prepared similarly as the one of Example 1 except that glyceryl cyanoacetate is used in place of cyanoethyl cyanoacetate. The former is prepared as follows:

170 g. of cyanoacetic acid
370 g. of glycerol
25 g. of toluene sulfonic acid, and
500 cc. of benzene are heated for 28 hrs. The ester is isolated by neutralizing the mixture with aqueous sodium bicarbonate saturating the solution with sodium chloride, and extracting the ester with ethyl acetate. This solution is then dried over anhydrous sodium sulfate and distilled to give a light brown oil-like material. As in Example 1, 0.5 mol of this product is used in the condensation reaction.

EXAMPLE 3

Preparation of:

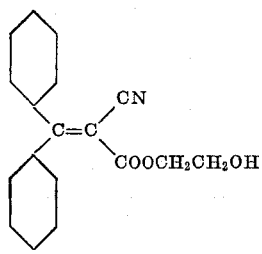

Example 1 is again repeated employing hydroxy ethyl cyanoacetate (0.5 mol) in place of cyanoethyl cyanoacetate. The intermediate employed in this example may be prepared in a manner similar to the intermediate described in Examples 1 and 2 except that the alcohol used is ethylene glycol.

EXAMPLE 4

Example 1 is again repeated employing as the cyanoacetate the following compound:

$$CNCH_2COOCH_2CH_2Cl$$

In the following examples, the indicated cyanoacetate compounds are condensed with benzophenone. In the table listed below, there also appears the identification of the Y substituent of the general formula given above.

TABLE I

| Example | Cyanoacetate compound | Y |
|---|---|---|
| 5 | CHCH$_2$COOCH$_2$CH$_2$CH$_2$OH | —CH$_2$CH$_2$CH$_2$OH |
| 6 | CNCH$_2$COOCH$_2$CH$_2$Br | —CH$_2$CH$_2$Br |
| 7 | CNCH$_2$COOCH$_2$CH$_2$F | —CH$_2$CH$_2$F |
| 8 | CNCH$_2$COOCH$_2$CH$_2$OCH$_3$ | —CH$_2$CH$_2$OCH$_3$ |
| 9 | CNCH$_2$COOCH$_2$CH$_2$OCH$_2$CH$_3$ | —CH$_2$CH$_2$OCH$_2$CH$_3$ |
| 10 | CNCH$_2$COOCH$_2$CH$_2$OCH$_2$CH$_2$OH | —CH$_2$CH$_2$OCH$_2$CH$_2$OH |
| 11 | CNCH$_2$COOCH$_2$CH$_2$OCH$_2$CH$_2$OOCCH$_3$ | —CH$_2$CH$_2$OCH$_2$CH$_2$OOCCH$_3$ |
| 12 | CNCH$_2$COOCH$_2$CH$_2$COOCH$_3$ | —CH$_2$CH$_2$COOCOOCH$_3$ |

EXAMPLE 13

Examples 1 through 12 are repeated employing, in place of benzophenone, the following benzophenone derivatives:

(A) 2-chlorobenzophenone
(B) 3-chloro-2-hydroxy-5-methyl benzophenone
(C) 2-chloro-4'-methyl benzophenone
(D) 2-chloro-4'-phenyl benzophenone
(E) 2-hydroxy-4-methyl benzophenone
(F) 4-methoxy-4'-methyl benzophenone
(G) 4-octyl benzophenone
(H) 2,3,4,5,6-pentachloro benzophenone
(I) 4-bromo benzophenone
(J) 4-cyano benzophenone
(K) 2-benzoyl benzoic acid amide
(L) 2-sulfamide benzophenone
(M) 2-phenyl benzophenone
(N) 3-methoxy benzophenone
(O) 2-phenoxy benzophenone
(P) 2-acetoxy benzophenone
(Q) 2,2'-dibromo benzophenone
(R) 4,4'-dichloro benzophenone
(S) 4(n-dodecyloxy) benzophenone
(T) 2,4'-dichloro benzophenone
(U) 2,2'-dihydroxy-4,4'-dipropoxy benzophenone

EXAMPLE 14

The compound of Example 3 is oxyalkylated with ethylene oxide to yield a polyoxyalkylated product carrying out the following procedure. To 1 mol of the compound of Example 3 containing 1% by weight based on the weight of said compound of potassium oxide there are added 6 mols of ethylene oxide while maintaining the mixture in an autoclave at 80° C. during the addition of the ethylene oxide. The resultant product disperses readily in water and may be used to treat hydrophilic materials such as paper and other cellulosic products such as cotton, jute and the like. This polyoxyalkylated product is also an excellent dispersing agent for pigments and dyestuffs, and when used in combination with these materials, it affords outstanding protection against ultra-violet light degradation.

EXAMPLE 15

The procedure of Example 14 is repeated employing 20 mols of ethylene oxide. The resultant product has outstanding surfactant properties and may be used to prepare emulsions of the oil-in-water and water-in-oil types. Such emulsions are well stabilized against ultra-violet light degradation.

EXAMPLE 16

The compound prepared from 2-sulfamide benzophenone and cyanoethyl cyanoacetate is oxypropylated with 9 mols of propylene oxide in the manner to that described in the preceding examples using ethylene oxide to yield a water and oil soluble surface active ultra-violet absorbing compound.

EXAMPLE 17

The compound of Example 5 is oxyethylated with 10 mols of ethylene oxide as described above and then further oxypropylated with 5 mols of propylene oxide, again as described above.

The compounds employed in this invention are in general in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 mols per mol of reactive hydrogen containing compound, range from soluble to extremely soluble in water, the solubility increasing as the number of oxyalkyl groups are increased.

The ultra-violet absorbers of the present invention may be used to stabilize resins and plastics in the form of films and molded products and in the form of clear, opaque, semi-opaque or translucent materials. In addition, foam plastics, fibers, pigments, polishes, creams, lotions, and the like may be protected. The compounds disclosed herein give outstanding protection to paint, enamel and varnish films against fading of pigments and dyes contained therein.

Other variations in and modifications of the described processes which will be obvious to those skilled in the art can be made in this invention without departing from the scope or spirit thereof.

We claim:
1. An essentially colorless ultra-violet light absorbing compound of the formula:

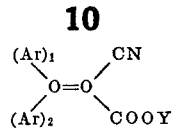

wherein:
(1) $(Ar)_1$ and $(Ar)_2$ are aromatic carbocyclic nuclei devoid of nitro and nuclear bonded amine groups and selected from the class consisting of mono- and bicyclic nuclei, and
(2) Y is a substituted alkyl group having from about 2 to about 17 carbon atoms in the alkyl moiety selected from the class consisting of hydroxy alkyl, cyanoalkyl, haloalkyl, alkoxyalkyl, hydroxy alkoxyalkyl and carbalkoxyalkyl.

2. A compound as defined in claim 1 wherein Y is hydroxy alkyl.
3. A compound as defined in claim 1 wherein Y is cyanoalkyl.
4. A compound as defined in claim 1 wherein Y is haloalkyl.
5. A compound as defined in claim 1 wherein Y is alkoxyalkyl.
6. A compound as defined in claim 1 wherein Y is hydroxy alkoxyalkyl.
7. A compound as defined in claim 1 wherein $(Ar)_1$ and $(Ar)_2$ are phenyl nuclei.
8. A compound as defined in claim 7 wherein at least one of $(Ar)_1$ and $(Ar)_2$ contains at least one substituent selected from the class consisting of alkyl, halogen, hydroxy, alkoxy, carboxy, carbonamide, cyano, sulfonamide, carbalkoxy, phenyl, tolyl, halophenyl, cyanophenyl, carboxy phenyl, acetoxy, hydroxyphenyl, alkoxyphenyl, phenoxy, tolyloxy and xylyloxy.
9. A compound as defined in claim 8 wherein Y is alkoxyalkyl.

References Cited
UNITED STATES PATENTS

| | | | |
|---|---|---|---|
| 2,623,060 | 12/1952 | Cragoe | 260—465 |
| 3,180,885 | 4/1965 | Nentwig et al. | 260—465 |

CHARLES B. PARKER, Primary Examiner

D. H. TORRENCE, Assistant Examiner

UNITED STATES PATENT OFFICE
CERTIFICATE OF CORRECTION

Patent No. 3,644,466                Dated February 22, 1972

Inventor(s) ALBERT F. STROBEL ET AL

It is certified that error appears in the above-identified patent and that said Letters Patent are hereby corrected as shown below:

Column 10, lines 1-4, the structural formula should read

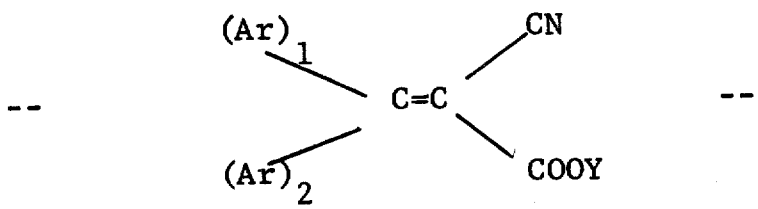

Signed and sealed this 11th day of July 1972.

(SEAL)
Attest:

EDWARD M. FLETCHER, JR.                ROBERT GOTTSCHALK
Attesting Officer                      Commissioner of Patents